(12) United States Patent
Buck et al.

(10) Patent No.: US 7,040,351 B2
(45) Date of Patent: May 9, 2006

(54) PLASTIC TUBE, ESPECIALLY A PNEUMATIC TUBE

(75) Inventors: Steffen Buck, Ludwigsburg (DE);
Hans-Jürgen Claus, Stuttgart (DE);
Klaus Zoller, Stuttgart (DE);
Hans-Walter Brenner, Stuttgart (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/496,387

(22) PCT Filed: Nov. 27, 2002

(86) PCT No.: PCT/EP02/13350

§ 371 (c)(1),
(2), (4) Date: May 24, 2004

(87) PCT Pub. No.: WO03/048622

PCT Pub. Date: Jun. 12, 2003

(65) Prior Publication Data

US 2004/0261877 A1    Dec. 30, 2004

(30) Foreign Application Priority Data

Dec. 6, 2001    (DE) ................. 101 60 060

(51) Int. Cl.
*F16L 11/12*    (2006.01)
(52) U.S. Cl. ............. 138/127; 138/123; 138/125; 138/124; 138/133; 138/138

(58) Field of Classification Search ............. 138/123, 138/127, 138, 133, 124, 125; 174/47, 102 R, 174/115, 11 R, 105 R
See application file for complete search history.

(56) References Cited

U.S. PATENT DOCUMENTS

| | | | | | |
|---|---|---|---|---|---|
| 646,886 | A | * | 4/1900 | Voorhees | 174/47 |
| 1,982,784 | A | * | 12/1934 | Buckley | 174/105 R |
| 2,056,085 | A | * | 9/1936 | Alles | 174/105 R |
| 2,320,367 | A | * | 6/1943 | Leathers | 174/47 |
| 3,070,132 | A | * | 12/1962 | Sheridan | 138/118 |
| 3,555,170 | A | * | 1/1971 | Petzetakis | 174/47 |
| 4,554,650 | A | * | 11/1985 | Brown et al. | 367/154 |
| 4,972,880 | A | * | 11/1990 | Strand | 138/98 |

FOREIGN PATENT DOCUMENTS

| | | |
|---|---|---|
| EP | 0 882 924 A2 | 12/1998 |
| GB | 2 211 266 A | 6/1989 |
| WO | WO 99/45305 | 9/1999 |

\* cited by examiner

*Primary Examiner*—Patrick Brinson
(74) *Attorney, Agent, or Firm*—Hoffmann & Baron, LLP

(57) ABSTRACT

A plastic hose, and more particularly a pneumatic hose, is provided with at least two electrical conductors extending along the hose body. These conductors are in the form of strips (11 and 12) of a metallized braid of plastic material or of natural fiber with a spacing apart on the hose body (13). Accordingly high flexibility of the plastic hose (10) is achieved with satisfactory electrical conductivity of the strips ensuring safety as regards breakage.

21 Claims, 3 Drawing Sheets

PLASTIC TUBE, ESPECIALLY A PNEUMATIC TUBE

This application claims priority based on an International Application filed under the Patent Cooperation Treaty, PCT/EP02/13350, filed on Nov. 27, 2002, and German Patent Application No. DE 101 60 060.7, filed on Dec. 6, 2001.

FIELD OF THE INVENTION

The invention relates to plastic hose and more especially to pneumatic hose comprising at least two electrical conductors extending along the hose body.

BACKGROUND OF THE INVENTION

More particularly pneumatic devices and equipment require electrical connections, in addition to pneumatic hose connections, for the transmission of electrical control signals, sensor signals and electrical power. In certain cases this may mean a relatively large number of conductors, hoses and cables make installation, servicing and repair expensive, complex and elaborate. Similar problems occur also in the case of hydraulic equipment and devices, in the case of which both fluids and also electrical signals must be transmitted.

In order to tackle this problem the German patent publication 19,827,883 A1 has for example suggested the integration of metallic conductors in the wall of a pneumatic hose. In order to maintain flexibility such conductors have to have an extremely small cross section, something which in turn means that contact means and measures must be relatively complex and involved. In order to render this possible at all the outline of the pneumatic hose must be asymmetrical in design in order to set the necessary angular position for the contact means to engage.

SUMMARY OF THE INVENTION

One object of the present invention is to provide a plastic hose for the transmission of fluid media using additional electrical conductors, in the case of which there is a simple and economic manufacture and a simpler contact making function while ensuring highly satisfactory flexibility.

In accordance with the invention this object is achieved since the conductors are constituted by a braided metallized material of plastic material or natural fiber applied in a spaced out manner to the hose body.

The braided metallized plastic material or of natural fiber is highly flexible so that the entire plastic hose is extremely flexible and long lasting, since the strip-like braid is extremely resistant to abrasion and complies with practically any movement of the hose. Breakage of the braid is more or less ruled out. Extremely small radiuses of curvature on bending of the plastic hose are possible without the conductivity being impaired by compression or excessive stretching. The width of the strip-like braid may extend over a large fraction of the periphery so that even in the case of an intended small thickness of the braid a satisfactory electrical conductivity is possible and the burst pressure is simultaneously increased. The width furthermore permits simple contact measures both radially (in the peripheral direction) and also axially (at the end).

A particularly satisfactory degree of flexibility as regards the compression or stretching of the braid is achieved since the braid essentially has fiber arrangements extending substantially perpendicularly to one another. In this case the fibers of one of the fiber arrangements preferably extend in the longitudinal direction of the respective strip.

The strips may extend in the longitudinal direction of the plastic hose or be arranged spirally around it.

The distance between the strips is made extremely small in order to attain maximum conductivity and is preferably less than 10% of the strip width.

To protect the outer face of the plastic hose against abrasion, short circuits between the conductive strips and undesired making of contact with metallic parts, earthing conductors or power elements the plastic hose is provided with a flexible tubular protective envelope of plastic material enveloping the strips.

The strips are preferably at least partially bonded or welded to the hose body or with a protective layer surrounding it or co-extruded with same. Co-extrusion offers the particular advantage that the plastic hose may be produced in a single working operation during extrusion.

Working examples of the invention are represented in the drawings and will be described in the following account in detail.

DESCRIPTION OF THE PREFERRED EMBODIMENTS

Figure 1:
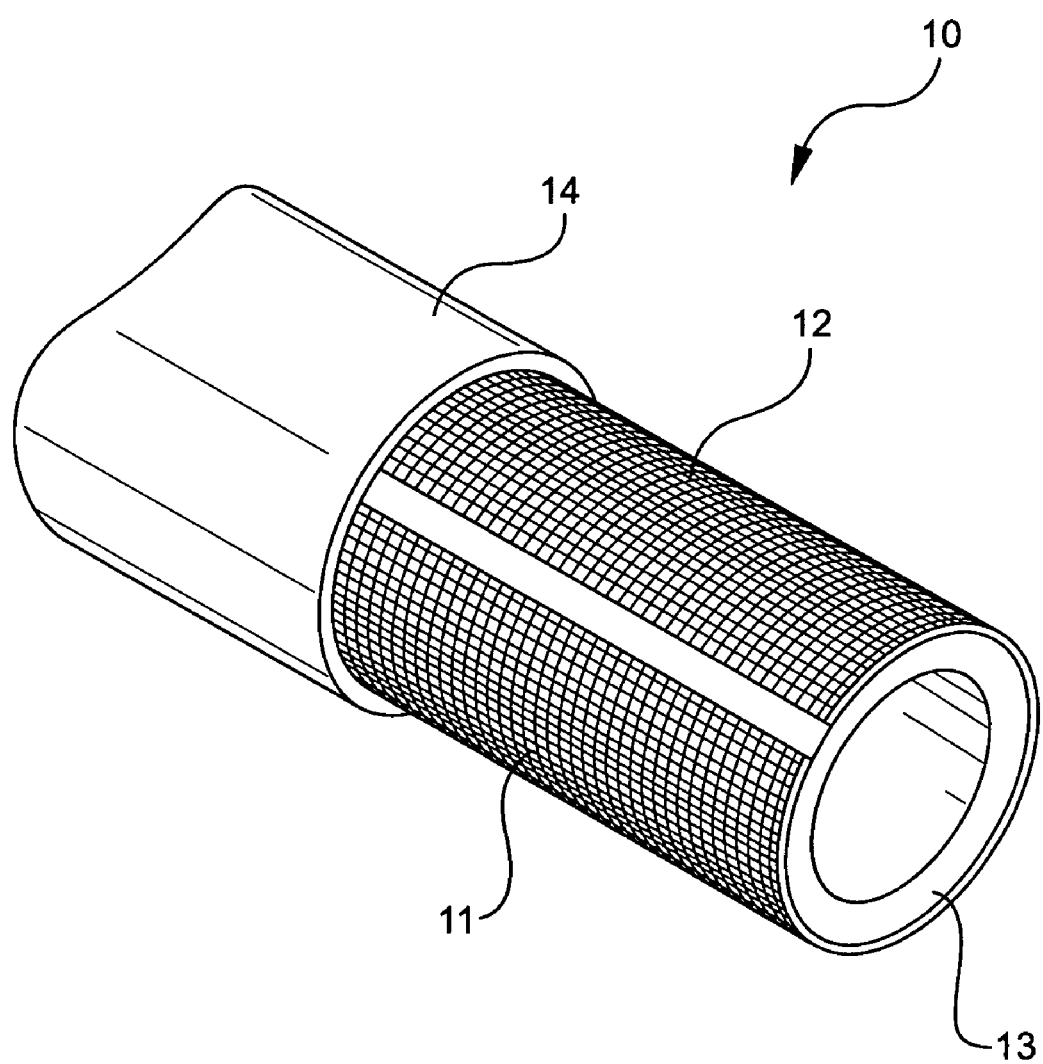
FIG. 1 shows a perspective elevation of a terminal region of a plastic hose whose prototype envelope is removed to make the drawing of the example simpler.

The plastic hose 10, illustrated in FIG. 1 in perspective, may for example be employed as a pneumatic hose, hydraulic hose or for other transmission of any liquid or gaseous media. Additionally electrical signals, as for instance sensor signals, control signals or electrical power may be conducted using two strips 11 and 12, that consist of metallized braid of plastic material or natural fiber.

The metallized braid of the two strips 11 and 12 possesses two fiber arrangements extending substantially at a right angle to one another, the fibers of one fiber arrangement extending in the longitudinal direction of the respective strip 11 and 12, that is to say in the longitudinal direction of the plastic hose 10.

The two strips 11 and 12 are applied to the outer side of a hose body 13 of plastic, which consists of a plastic material conventional for such hose, for example polyurethane, polyethylene, polypropylene, PTFE or PVC. To the extent that the braid strips 11 and 12 does not consist of natural fiber, it is possible for it to consist one of the above mentioned plastic materials, the braid in any case being metallized to achieve the necessary electrical conductivity.

In the working embodiment illustrated in FIG. 1, two strips 11 and 12 extend in parallelism to one another in the longitudinal direction of the plastic hose and are at a small distance to provide the necessary electrical separation. This distance may be extremely small, as for example smaller than 10% of the width of one strip 11 or, respectively, 12. That is to say the strips 11 and 12 are made as wide as possible to achieve maximum electrical conductivity. The invention is naturally not limited two strips 11 and 12, and in fact the number of the strips may be larger as well in accordance with the number of the desired electrical conductors, the width of the strips being reduced if their number is increased.

The strips 11 and 12 may be bonded or welded to the hose body 13 and furthermore they may be co-extruded with the hose body 13, something which would appear to be the best manner of production.

If required an intermediate or guard layer may be arranged between the hose body 13 and the strips 11 and 12. In this case the strips 11 and 12 are naturally applied to this guard layer.

Figure 2:
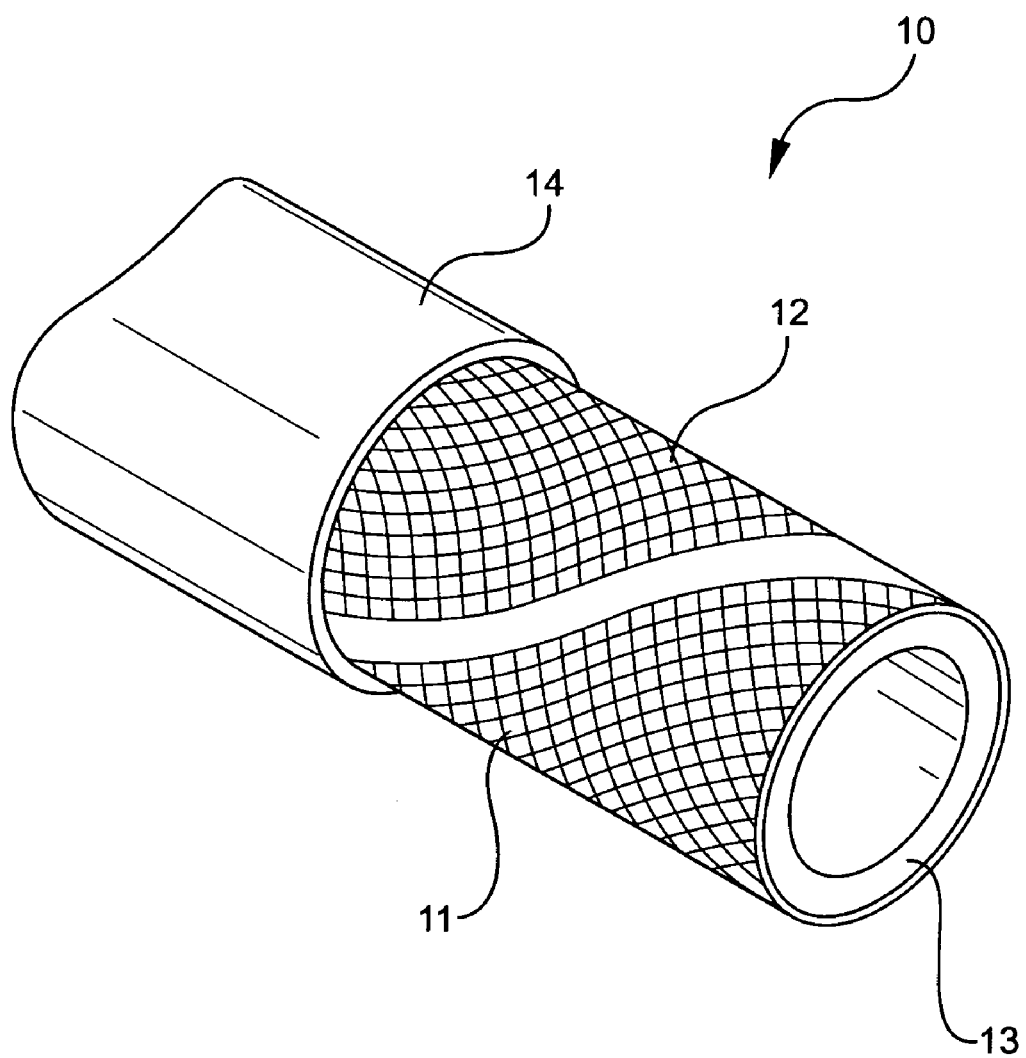
FIG. 2 shows a perspective elevation of an alternative embodiment of the hose shown in FIG. 1.

Instead of the arrangement of the strips 11 and 12 in the longitudinal direction of the plastic hose 14 it is possible for them to be arranged in a spiral fashion on the hose body, as shown in FIG. 2.

The hose body 13 provided with the strips 11 and 12 is in addition surrounded by a hose-like protective envelope 14 of non-conductive plastic material. This material may be applied during extrusion or later on. The thickness of the conductive braid may be extremely small and for example be merely of the order of $\frac{1}{10}$ mm. Accordingly the overall diameter of the plastic hose 10 is hardly different to that of conventional hose and it is possible for extremely small dimensions to the achieved.

Owing to the width of the strips 11 and 12 the electrical contact means is extremely simple to realize and may be take place peripherally or from the end, for example by using screw means having suitable contacts. In this case the protective envelope 14 may either be removed at the point of contact or contact spikes are employed, which pierce the protective envelope 14 to contact the strips 11 and 12.

Figure 3:
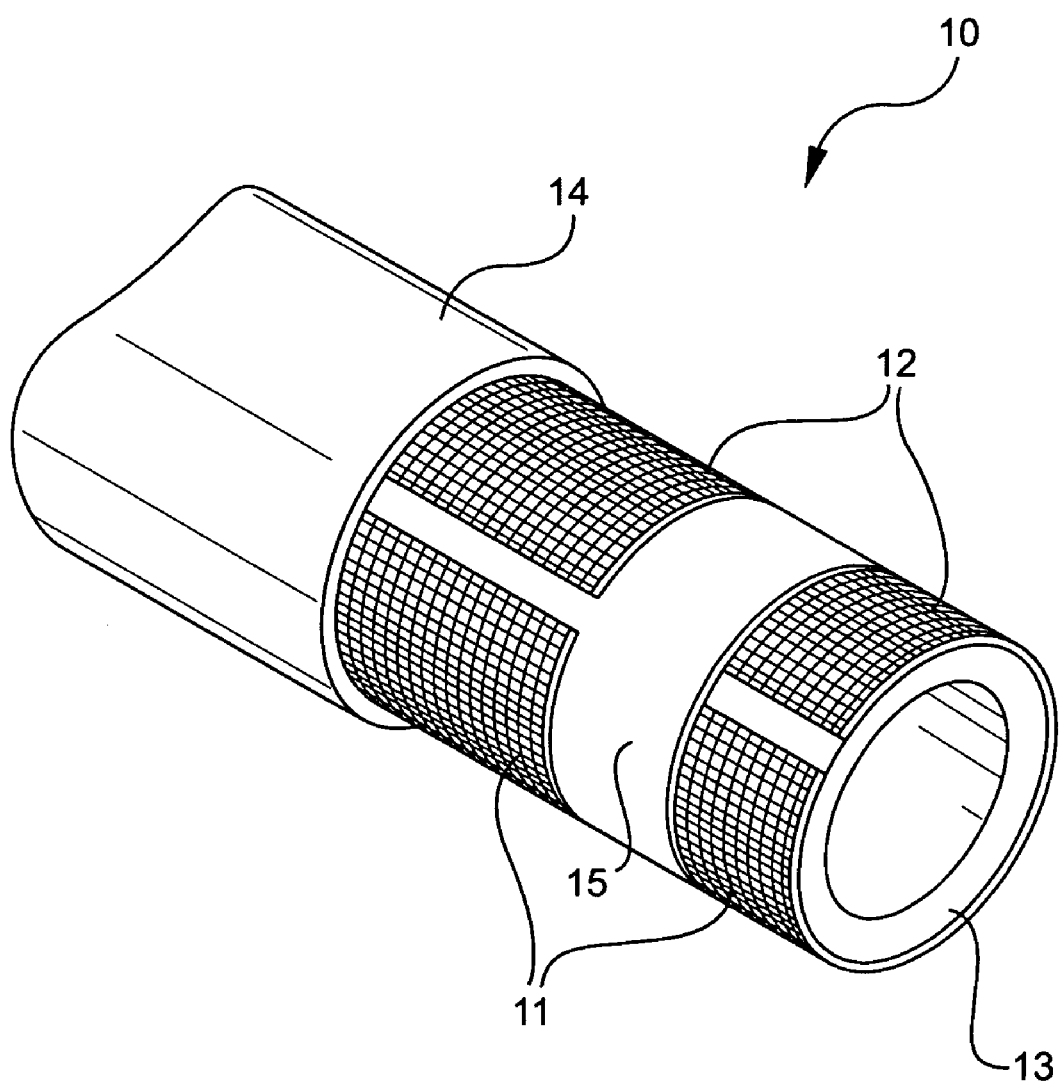
FIG. 3 shows a perspective elevation of another alternative embodiment of the hose shown in FIG. 1.

As shown in FIG. 3, such conductive strips 11 and 12 may also be arranged in several, for example two, layers on top of each other, electrically insulating intermediate layers 15 being necessary for mutual insulation. In this case each layer may comprise one or more strips. In the case of there being one sole strip per layer, same may also be hose-like in design. In the case of a plurality of strips per layer same may be arranged over each other with a radial alignment as shown.

What is claimed is:

1. A plastic hose comprising at least two electrical conductors extending along the hose body, wherein the conductors are in the form of strips of a metallized braid of plastic material or natural fiber, said strips extending spaced apart on the hose body, wherein the distance apart of the strips is substantially smaller than 10% of the strip width.

2. A plastic hose comprising at least two electrical conductors extending along the hose body, wherein the conductors are in the form of strips of a metallized braid of plastic material or natural fiber, said strips extending spaced apart on the hose body, further comprising a protective envelope of plastic material enveloping the strips.

3. The plastic hose as set forth in claim 1 wherein the strips are connected at least partially by bonding, welding or co-extrusion with the hose body or with a protective layer surrounding it.

4. A plastic hose comprising at least two electrical conductors extending along the hose body, wherein the conductors are in the form of strips of a metallized braid of plastic material or natural fiber, said strips extending spaced apart on the hose body, wherein the hose body consists of polyurethane, polyamide, polyethylene, polypropylene, PTFE or PVC.

5. A plastic hose comprising at least two electrical conductors extending along the hose body, wherein the conductors are in the form of strips of a metallized braid of plastic material or natural fiber, said strips extending spaced apart on the hose body, wherein the strips are arranged in a plurality of superposed layers and are radially insulated from one another by electrically insulating intermediate layers.

6. The plastic hose as set forth in claim 5, wherein the strips are respectfully superposed with a radial alignment.

7. The plastic hose as set forth in claim 1, wherein the braid of the strips possesses fiber arrangements which extend substantially at a right angle to one another.

8. The plastic hose as set forth in claim 7, wherein the fibers of a fiber arrangement extend in the longitudinal direction of the respective strip.

9. The plastic hose as set forth in claim 1, wherein the strips extend in its longitudinal direction or are spirally wound around the hose body.

10. The plastic hose as set forth in claim 2, wherein the braid of the strips possesses fiber arrangements which extend substantially at a right angle to one another.

11. The plastic hose as set forth in claim 10, wherein the fibers of a fiber arrangement extend in the longitudinal direction of the respective strip.

12. The plastic hose as set forth in claim 2, wherein the strips extend in its longitudinal direction or are spirally wound around the hose body.

13. The plastic hose as set forth in claim 2, wherein the strips are connected at least partially by bonding, welding or co-extrusion with the hose body or with a protective layer surrounding it.

14. The plastic hose as set forth in claim 4, wherein the braid of the strips possesses fiber arrangements which extend substantially at a right angle to one another.

15. The plastic hose as set forth in claim 14, wherein the fibers of a fiber arrangement extend in the longitudinal direction of the respective strip.

16. The plastic hose as set forth in claim 4, wherein the strips extend in its longitudinal direction or are spirally wound around the hose body.

17. The plastic hose as set forth in claim 4, wherein the strips are connected at least partially by bonding, welding or co-extrusion with the hose body or with a protective layer surrounding it.

18. The plastic hose as set forth in claim 5, wherein the braid of the strips possesses fiber arrangements which extend substantially at a right angle to one another.

19. The plastic hose as set forth in claim 18, wherein the fibers of a fiber arrangement extend in the longitudinal direction of the respective strip.

20. The plastic hose as set forth in claim 5, wherein the strips extend in its longitudinal direction or are spirally wound around the hose body.

21. The plastic hose as set forth in claim 5, wherein the strips are connected at least partially by bonding, welding or co-extrusion with the hose body or with a protective layer surrounding it.

* * * * *